US 6,683,629 B1

(12) United States Patent
Friskel et al.

(10) Patent No.: US 6,683,629 B1
(45) Date of Patent: Jan. 27, 2004

(54) METHOD IN A COMPUTER SYSTEM FOR EMBEDDING A CHILD WINDOW IN A PARENT WINDOW

(75) Inventors: James Friskel, Cocoa Beach, FL (US); Robert W Temple, Fountain Hills, AZ (US); Daniel J Kowalyshyn, Tempe, AZ (US)

(73) Assignee: Neoplanet, Inc., Tempe, AZ (US)

( * ) Notice: Subject to any disclaimer, the term of this patent is extended or adjusted under 35 U.S.C. 154(b) by 387 days.

(21) Appl. No.: 09/632,250

(22) Filed: Aug. 3, 2000

(51) Int. Cl.[7] ................................................. G06F 3/00
(52) U.S. Cl. ....................................... 345/804; 345/805
(58) Field of Search .................................. 345/804, 805

(56) References Cited

U.S. PATENT DOCUMENTS

| | | | | |
|---|---|---|---|---|
| 5,757,914 A | * | 5/1998 | McManis .................... | 713/187 |
| 5,933,140 A | * | 8/1999 | Strahorn et al. ............ | 345/712 |
| 6,405,224 B1 | * | 6/2002 | Van Der Meer ............ | 715/513 |
| 6,456,303 B1 | * | 9/2002 | Walden et al. .............. | 345/705 |
| 6,460,058 B2 | * | 10/2002 | Koppolu et al. ............ | 345/738 |
| 6,496,201 B1 | * | 12/2002 | Baldwin et al. ............ | 345/753 |

OTHER PUBLICATIONS

Kyle Marsh, Win32 Hooks, Feb. 1994, Microsoft Developer Network Technology Group, http://msdn.microsoft.com/library/en-us//dnwui/html/msdn_hooks32.asp?frame=true, p. 1–13.*

CBTProc: a Microsoft web–site manual document at wysiwyg://13/http://msdn.microsoft.com/library/psdk/winbase/hooks 6e5f.htm, Jul. 25, 2000.

SetWindowHookEx: a Microsoft web–site manual document at wysiwyg://24/http://msdn.microsoft.com/library/psdk/winbase/hooks 7vaw.htm, Jul. 25, 2000.

Hooks: a Microsoft web–site manual document at wysiwyg://15/http://msdn.microsoft.com/library/psdk/winbase/hooks 9rg3.htm, Jul. 25, 2000.

* cited by examiner

Primary Examiner—Cao (Kevin) Nguyen
(74) Attorney, Agent, or Firm—Morgan, Lewis & Bockius LLP (57) ABSTRACT

A window defined by an add-on program is displayed to a user of an application program in a computer system. The add-on program detects the display to the user of an application window created by the application program. In response to this detection, the add-on program displays an add-on window to the user. The add-on window may enable the user to initiate new functions in the computer system, and the add-on window may be a child window (which is defined by the add-on program) that is embedded in a parent window displayed by the application program.

29 Claims, 9 Drawing Sheets

```
┌─────────────────────┐
│ Determine Parent Window │
│  System Definition  │
│         700         │
└──────────┬──────────┘
           │
           ▼
┌─────────────────────┐
│  Create Child Window │
│  Under Parent Window │
│         702         │
└──────────┬──────────┘
           │
           ▼
┌─────────────────────┐
│  Display Child Window│
│         704         │
└─────────────────────┘
```

METHOD IN A COMPUTER SYSTEM FOR EMBEDDING A CHILD WINDOW IN A PARENT WINDOW

BACKGROUND

The present invention relates in general to a computer system and more particularly to a computer system for displaying one or more windows to a user of the computer system using, for example, a computer monitor.

Windows are a common way of displaying information to a user of a computer system. Typically, software programs that run on computer systems intended for consumer or many other types of end-user applications will provide a user interface comprising many windows containing different types of information. A "window" generally refers to a defined portion of a display screen, such as a computer monitor, within which informational content is provided by the computer program. Typically, a window permits a computer program or operating system to take actions on the window and its content that are independent of information displayed outside of the window. As an example, the location of a window on a computer monitor may be moved by the user using, for example, a mouse. The user may also resize or collapse the window into a smaller window using a "close window" icon on a portion of the window, which is typically represented as an "x" located in an upper corner of the window. In other cases, a user may scroll the information in one window without affecting the display of information in other windows such as, for example, in an Internet browser computer program (or simply "browser") using multiple frames for presenting information. An example of such a browser is Netscape Communicator version 4.72 distributed by Netscape Communications Corporation.

As the computer program executes and responds to various options selected by a user or even other events detected by, for example, a server where the program is a client program, the program will display several windows to the user. These windows are conventionally rectangular in shape, but may have other artistic shapes defined by the program. Often, multiple windows will overlap on the user display as each new window is displayed.

Windows are extensively used for presenting information obtained from the Internet to computer users, such as by the browser mentioned above. Browsers and other Internetenabled software also may initiate the display of additional windows to the user during operation. Such windows are typically designed by the developer of the software to complement or supplement other browsing or Internet services being provided to the user by or through the software. An example of such a complementary service would be an advertisement pop-up window that appears when the user is viewing certain content or taking specific actions, for example requesting an Internet search on a sports topic.

As the Internet continues to become an ever more pervasive means of commerce, competitors to the company that developed certain software, for example the browser mentioned above, will desire to find ways to attract the attention and interest of users of the software by displaying windows to the user that have been generated by the competitor. This is related in large part to the desire to present advertisements to users and to receive a commission for sales made by the user directly or indirectly through the competitor's window. However, browser developers, along with developers of other Internet software applications, generally do not desire that competitors be able to readily display such competitive windows in the absence of an advertising or other marketing agreement.

Also, users of application programs for the Internet or otherwise often desire to add additional functionality that does not exist in one of the original programs. So-called add-on programs are widely available to add such additional functionality. Frequently, the developer of an application program will provide an application program interface (API) to permit ready design and interoperability of such add-on programs. In other cases, however, no API is provided. It would be desirable to have an improved way to add functionality to a program provided without an API by the display of one or more additional windows generated by the add-on program so that a user can still add additional functionality in such cases.

Accordingly, there is a need for an improved way to add functionality to Internet and other software programs not having published APIs. Also, business competitors or others desiring to present competitive or other types of product and/or service information to users of a software program have a need for displaying windows to a user of a computer system running the software program where such display is initiated based on actions taken by users of, or events associated with, the software program.

DETAILED DESCRIPTION

The present invention generally provides a method, system, and computer product for displaying a window to a user of a computer system. In a first approach, the present invention comprises detecting the display to the user of an application window created by an application program. This detection is done by an add-on program. In response to detecting the display of the application window, the add-on program displays an add-on window to the user.

In a second approach according to the present invention, the add-on window enables the user to initiate a function in the computer system. Examples of such functions include displaying additional windows with new content or launching or initiating other applications in the computer system from the add-on window. In a third approach, the add-on window is a child window that is embedded in a parent window. The child window is defined by the add-on program and the parent window is defined by the application program.

Figure 1:
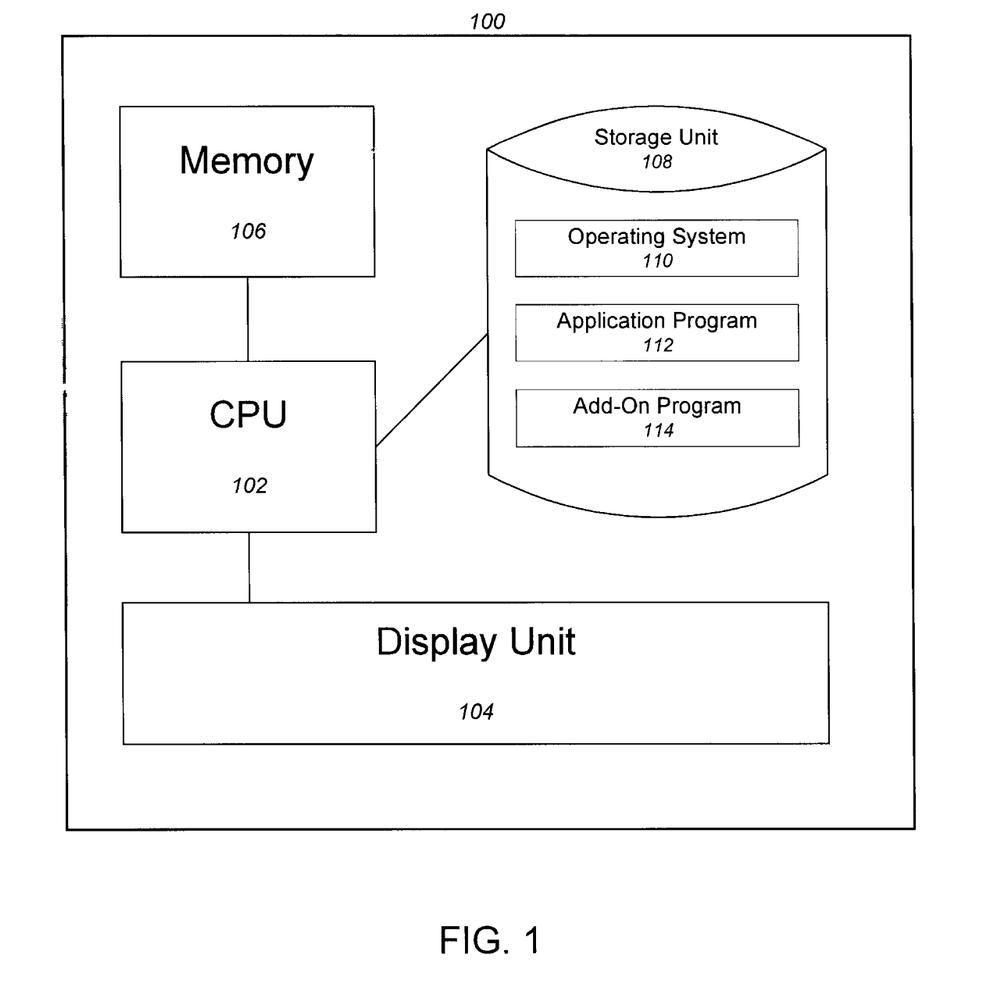
FIG. 1 illustrates a computer system for executing an application program stored in the system and including an add-on program for displaying a window on a display unit according to the present invention.

The above features and other innovative features of the present invention are described below with reference to specific embodiments as illustrated in the figures listed above. In general, FIG. 1 illustrates a computer system for executing an application program stored in the system and including an add-on program for displaying a window on a display unit according to the present invention. More specifically, as shown in FIG. 1, a computer system 100 comprises central processing unit (CPU) 102 coupled to display unit 104 and to memory 106. As an example, CPU 102 is a microprocessor, display unit 104 is a flat-panel display or cathode ray tube monitor, and memory 106 is dynamic random access memory. CPU 102 is also coupled to storage unit 108, which is for example a hard disk drive, compact disc read only memory (CD-ROM), or other type of permanent memory storage device. In other embodiments, storage unit 108 also may be directly coupled to memory 106, such as used in conventional direct memory access (DMA).

Storage unit 108 stores operating system 110, application program 112, and add-on program 114. Operating system 110 governs the operation of computer system 100 and is, for example, the Microsoft Windows 98 Operating System. Application program 112 is an executable computer program (also referred to herein as a software program) that is executed by CPU 102 within operating system 110. Application program 112 includes many types of programs that provide useful processing to a user including, for example, Internet browser and electronic mail (or simply "e-mail") programs, word processing programs, spreadsheet programs, and database programs. A specific example of application program 112 is the end-user access software used to access the Internet service provided by America Online.

Add-on program 114 is another computer program that is generally designed to work in conjunction with and/or provide additional functionality to application program 112. In some cases, add-on program may be developed by the same developer that has designed application program 112. However, in other cases, an API is provided by the developer of application program 112 to third parties who independently develop add-on program 114 based on the API. In yet other cases, no API is provided, and third party developers may design add-on program 114 to work with application program 112. According to the present invention, a method for designing add-on program 114 to work with application program 112 in the absence of such an API is described herein. Add-on program 114 may be implemented in any of several conventional programming languages.

Figure 2:
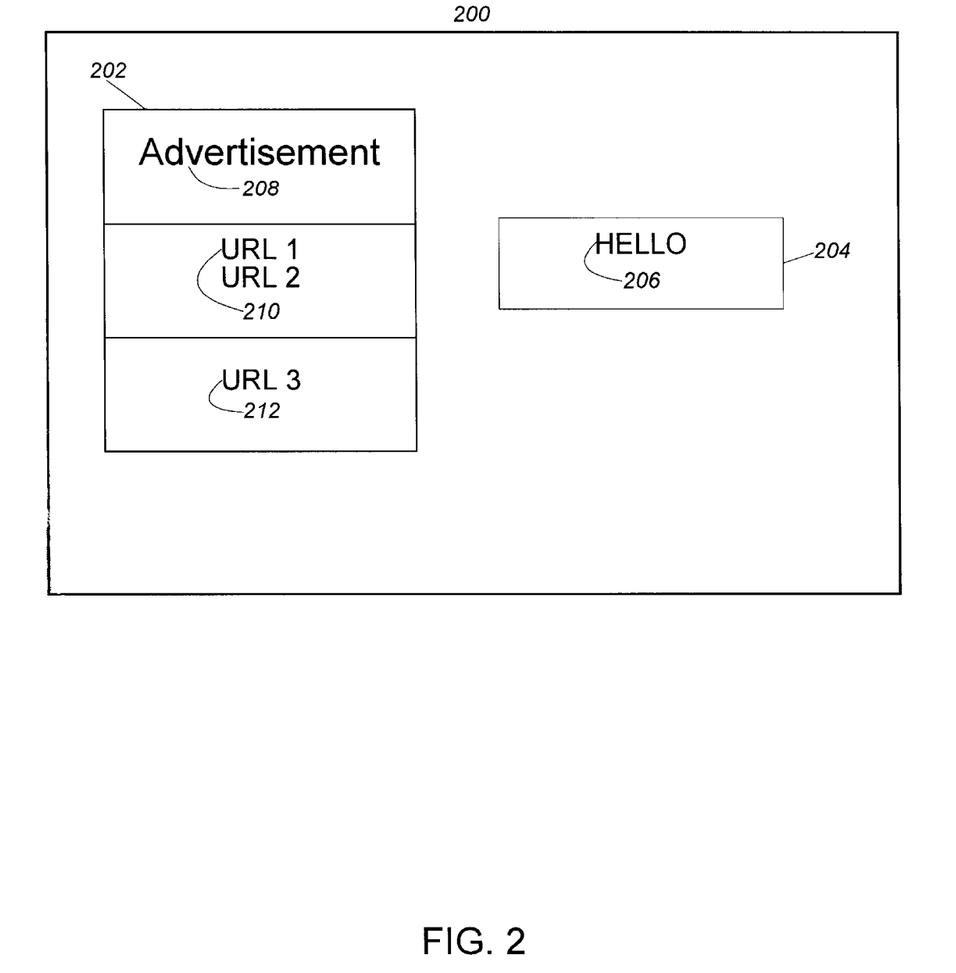
FIG. 2 illustrates a parent window generated by the application program and an add-on window generated by the add-on program as displayed on the display unit of FIG. 1.

FIG. 2 illustrates a parent window 200 generated by application program 112 and an add-on window 202 generated by add-on program 114. Parent window 200 is displayed on display unit 104 and typically contains the user interface for application program 112. Parent window 200 is described here for purposes of illustration as a window associated with an application program using a multiple document interface, but the present invention may also be used with windows generated by other types of approaches. Add-on window 202 is displayed with content defined by add-on program 114.

Add-on program 114 typically comprises several files, including a main executable file, for executing various functional aspects of the program and defining the content or the location of the content, whether local or remote, to be displayed in add-on window 202. These files are often implemented as a related group of dynamically linked files that are intended to be linked with the main executable file during execution depending on events, for example, detected by the main executable file.

As an example of the content that may be displayed, add-on window 202 contains advertisement 208 and links 210 and 212 that the user may use to access new content for display in add-on window 202, such as uniform resource locators (URLs) used in the World Wide Web on the Internet. Many other types of content may be displayed such as streaming video or other dynamic content. In addition, the add-on window may include pull-down or other types of menus and/or present icons that the user can use to start or initiate other services or functions that may be associated with application program 112 or be of other interest to the user. Further, the functions initiated or executed from within add-on window 202 may be functions that are executed by computer code associated with application program 112 as described further below.

The content and other functions presented for viewing and action by the user often will be complementary to those provided by parent window 200 or other windows displayed by application program 112. However, in other cases, it may be desirable that the content and services presented by add-on window 202 be a competitive substitute to that originally generated and displayed by application program 112. As an example, a service provider that distributes add-on program 114 may desire to compete with products and/or services offered to the user by windows displayed by application program 112.

Add-on window 202 may be displayed in response to certain events associated with application program 112. These events include the launching or initiation of application program 112 as a process running in operating system 110, the display of certain windows by application program 112, or other events that may be detectable in some manner. Generally, according to the present invention, add-on program 114 is running on computer system 100 and will detect one of the foregoing events as will be described in more detail below. In response to this detection, add-on program 114 will display add-on window 202 on display unit 104. In another approach to the present invention, add-on program 114 may display add-on window 202 in response to a user request from, for example, a menu provided by operating system 110.

As an example of an event by application program 112 that is detected by add-on program 114, application window 204 is displayed during the operation of application program 112. For example, application window 204 is an introduction or welcome window containing a greeting 206 such as "Hello". The introduction window is the first or one of the earliest windows opened after the initiation of application program 112. The opening of such an introduction window can be used by add-on program 114 to indirectly determine that application program 112 has been started by the user. In other approaches, other windows displayed by application program 112 can be detected and used to initiate the display of add-on window 202. Also, several additional add-on windows (not shown) having varying content associated with the specific events or contents displayed in various application windows can be opened and displayed by add-on program 114 along with or instead of add-on window 202.

In a specific approach, add-on window 202 is a child window embedded in parent window 200. Also, application window 204 is another child window embedded in parent window 200. As is known, a parent window may have several child windows. Add-on window 202 is displayed as a child window as described in more detail below. It should be noted that window 200 is specifically described herein as a parent window for illustration purposes, but the present invention is also useful with windows that do not have a parent-child relationship.

Figure 3:
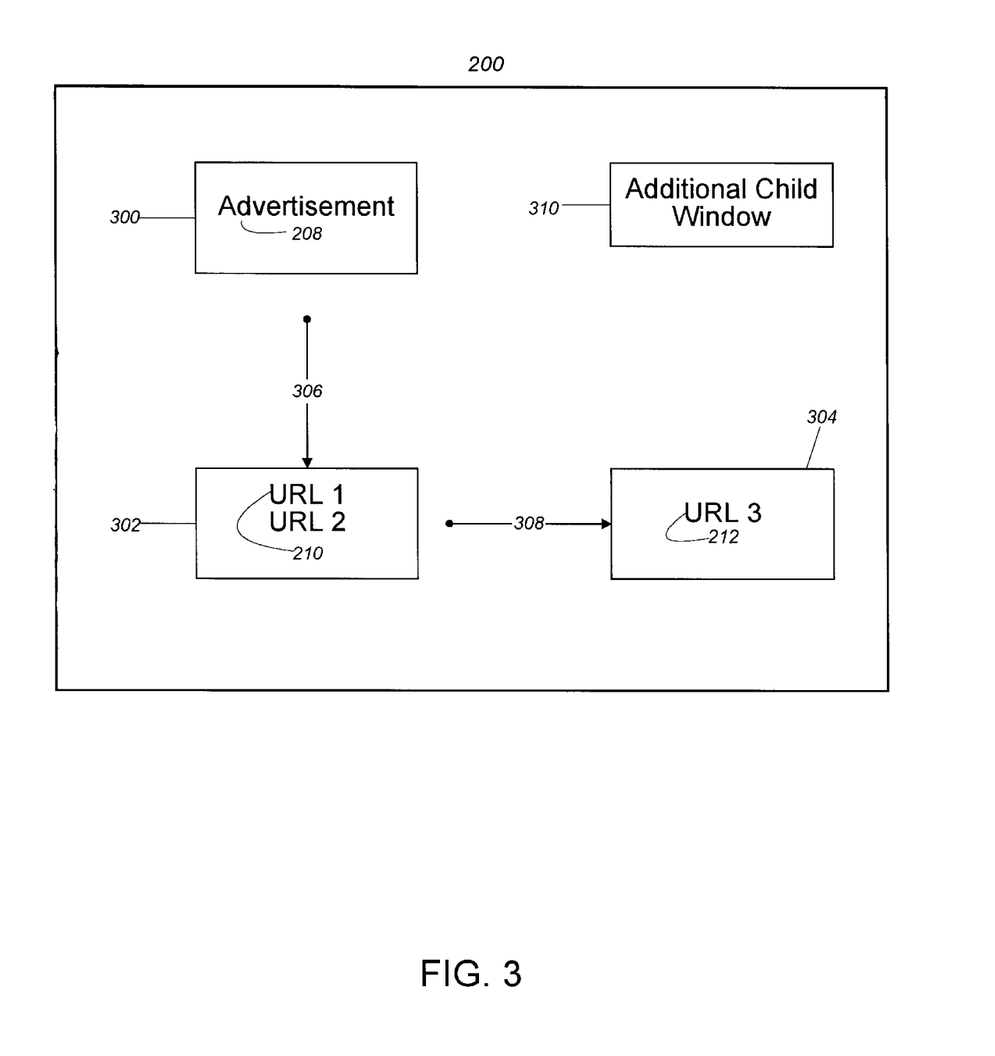
FIG. 3 illustrates detachable windows associated with the add-on window of FIG. 2.

FIG. 3 illustrates detachable windows 300–304 associated with add-on window 202 of FIG. 2. Specifically, detachable windows 300–304 are portions of add-window 202 that the user may separate and move independently within parent window 200, for example, using a mouse. The movement of detachable windows is indicated by arrows 306 and 308. Also, detachable windows may be closed or resized independently of one another. Detachable windows 300–304 move in unison when joined or docked together as illustrated in FIG. 2, but move independently when not joined (or un-docked). Further, the sizes of the detachable windows do not change when docked together.

During the operation of add-on program 114, additional windows may be displayed that are defined by one or more files associated with add-on program 114. An example of such a window is additional child window 310. Add-on window 202 is generally described herein as a single window, but it should be noted that add-on window 202 may be implemented by one or more child windows each corresponding to a detachable window.

Figure 4:
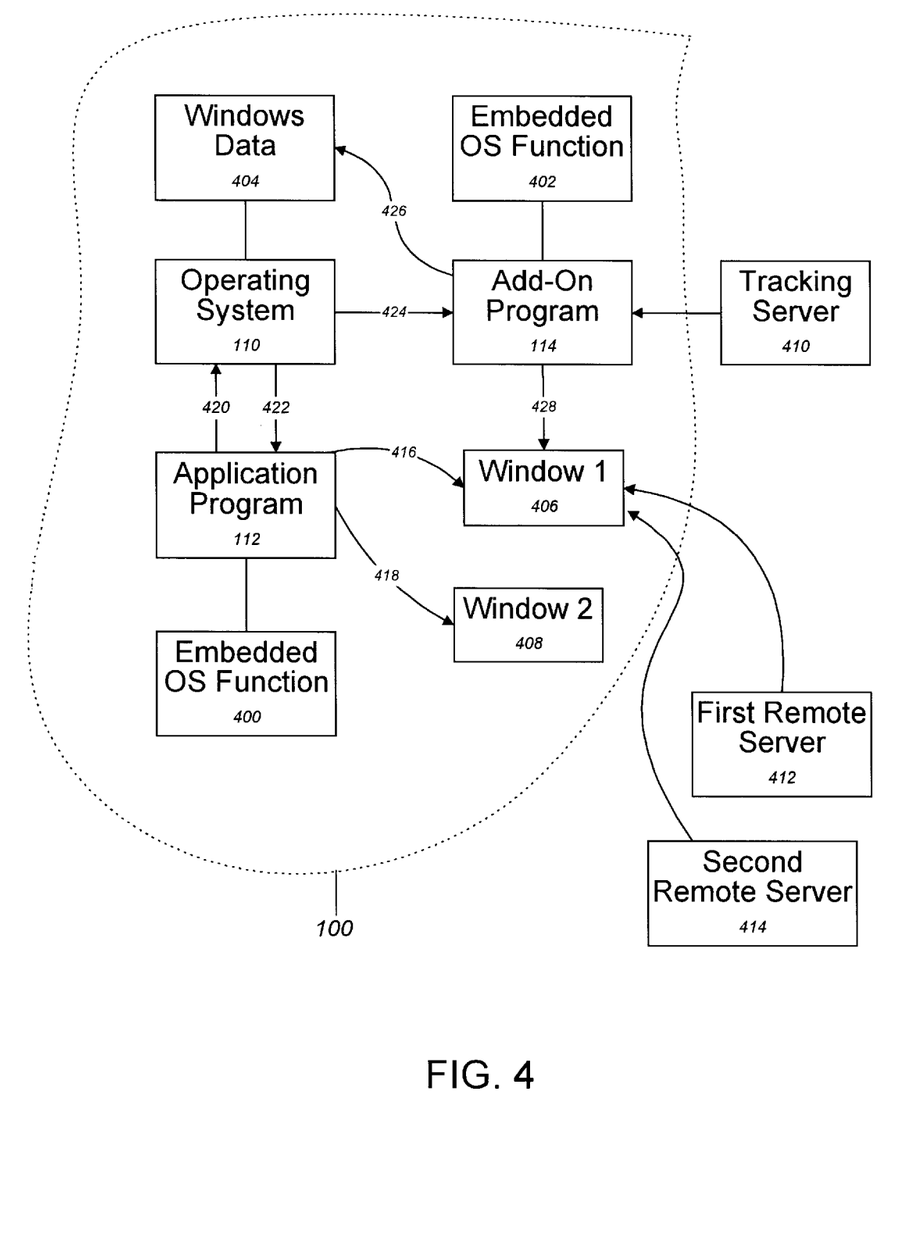
FIG. 4 illustrates software and hardware process and data interactions within the computer system of FIG. 1 and with external server computers.

FIG. 4 illustrates software and hardware process and data interactions within computer system 100 and with external server computers. Application program 112 comprises one or more embedded operating system functions 400, and add-on program 114 comprises one or more embedded operating system functions 402. During the operation of computer system 100, operating system 110 monitors and stores information associated with windows being displayed within computer system 100 as windows data 404, which may be stored in memory 106. Windows data 404 includes information such as a window handle to permit other programs to access the window, the window class, and the corresponding application displaying the window for each window in computer system 100.

Functions 400 and 402 are functions defined and made available by operating system 110 to computer program processes running in computer system 100. Some of these functions permit add-on program 114 to call for portions of windows data 404 to determine information about windows that are being displayed. As discussed further below, add-on program 114 can use embedded function 402 to determine, for example, when application program 112 displays certain windows by examining the characteristics of the information associated with such windows as stored in windows data 404. An example of embedded operating system function 400 is an operating system function to create a window. An example of embedded operating system function 402 is a function call to determine window characteristics as described above. Other examples of operating system functions described above are used in the Windows Operating Systems available from Microsoft Corporation.

Windows 406 and 408 are windows displayed (indicated by arrows 416 and 418) by application program 112. Window 406 corresponds to parent window 200 of FIG. 2.

Window 408 corresponds to another window that may be generated by application program 112. Window 408, for example, may be a second parent window. During the operation of application program 112 in displaying each window, an operating system call 420 is made to operating system 110 to have information associated with the window registered by operating system 110. This registration information is stored in windows data 404 and includes information such as, for example, the size and title of the window. Application program 112 uses operating system function calls as a part of displaying each of windows 406 and 408. Application program 112 also may embed child windows (not shown) in window 406 during its operation.

In response to the registration of windows by operating system call 420, operating system 110 provides messages 422 in reply to application program 112 regarding such registration such as, for example, an identification handle corresponding to each window so that application program 112 can later take actions associated with windows it has created. Add-on program 114 is programmed to intercept operating system messages associated with windows being displayed by application program 112 by message interception 424. For example, these messages may be events (such as window creation) that are monitored by the operating system. In other approaches, message interception 424 may instead be accomplished by operating system queries by add-on program 114. An example of such a query is a request for information about windows that have been displayed, and this information is obtained by add-on program 114 from the operating system as accessed from windows data 404.

In one approach, add-on program 114 accomplishes message interception 424 by using operating system hooks provided and defined by operating system 110. An example of such hooks are the Computer-Based Training (CBT) hooks provided with the Microsoft Windows Operating System. These hooks are examples of embedded operating system functions 402 and are implemented, for example, by embedding one or more computer-based training hook function calls within the program code for add-on program 114.

In response to message interception 424, add-on program 114 may make one or more additional operating system function calls 426 to determine additional information from operating system 110 regarding windows data 404. Function calls 426 correspond to embedded functions 402. As discussed further below, this information is requested to identify a particular window opened by application program 112, such as application window 204 of FIG. 2.

To implement the CBT hooks, add-on program 114 comprises a main executable file that is launched at the start-up or booting of computer system 100. This executable file contains a hook function to implement CBT hooks, for example, as designed by Microsoft for use with the Windows Operating System. Because of the way that the Windows Operating System implements CBT hooks, one of the files that is part of add-on program 114 is linked with every process that is started in operating system 110, including the process associated with application program 112. This is, for example, accomplished using a dynamically-linked file (or "dll" file). This file contains the embedded hook function and performs message interception 424 to obtain information about each window opened by application program 112.

When add-on program 114 detects the display of application window 204, add-on program 114 displays add-on window 202 (see FIG. 2). In FIG. 4, the display of add-on window 202 is illustrated as the embedding 428 of a child window in window 406. The child window is defined by one of the dll files associated with add-on program 114. This may be the same file that has been linked with application program 112 and that contains the logic used to detect specific events associated with application program 112. However, in general, another dll file that defines add-on window 202 will be loaded by the previously-linked dll file containing the foregoing detection logic. Further dll files can be linked with application program 112 as needed to open new child windows or launch additional functions or services requested by the user through one or more previously-opened add-on windows. In other approaches to the present invention, add-on window 202 can be a window that is independent of window 406, such as a new parent window.

External or remote computer servers may interact with computer system 100 in several ways. This interaction is, for example, done using standard Internet communication protocols. Tracking server 410 monitors the events and actions taken by the user of add-on program 114 and also periodically updates the code for add-on program 114 by, for example, transmitting new dll files to computer system 100 to become part of add-on program 114. The type of information sent to tracking server 410 by add-on program 114 includes, for example, statistics regarding the types of windows viewed by the user, the length of time certain windows are viewed, and the functions selected by the user during operation of add-on program 114. Additional information may include similar information regarding the usage by the user of application program 112. The collection of such usage information regarding application program 112 using add-on program 114 may in some cases provide a convenient method for collecting marketing data without the need to modify or reverse engineer the source code for application program 112.

First remote server 412 provides content for window 406 such as, for example, streaming video, news, advertisements, or other information regarding products and/or services being offered to the user. Server 412 may also provide streaming audio accessed by the user through an add-on window. The content is called by a link embedded in window 406, for example, using hypertext markup language (HTML) to add a link to a World Wide Web page. Such a link may be provided in a window defined by either application program 112 or add-on program 114. Second remote server 414 provides additional content to, for example, a new child window launched and embedded in parent window 406 by action of the user of add-on program 114.

Either first or second remote servers 412 and 414 may be used to execute and close a business transaction, for example using standard electronic commerce (or e-commerce) techniques, with the user based on content provided to the user. As mentioned above, a feature of the present invention is that commercial information can be provided to the user in an intelligent manner responsive to information associated with the user as collected by tracking server 410 or otherwise. This commercial information may offer products and/or services that are competitive to similar items associated with content defined by or accessed using application program 112.

Figure 5:
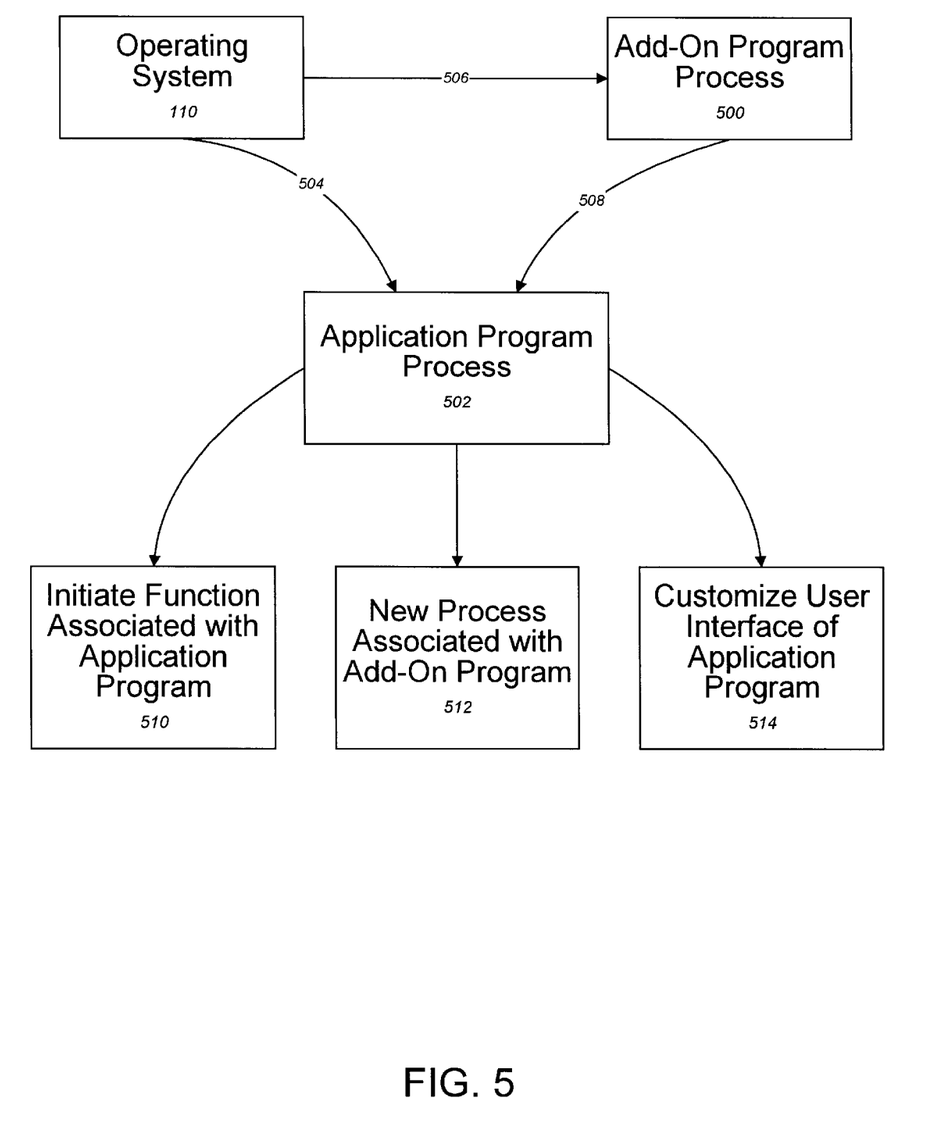
FIG. 5 illustrates operating system process interactions between the application program and add-on program of FIG. 1.

FIG. 5 illustrates operating system process interactions between application program 112 and add-on program 114. Specifically, as discussed above, operating system initiates the launch 504 of a process 502 for application program 112 and the launch 506 of a process 500 for add-on program 114. As mentioned above, add-on process 500 is launched before application program process 502 when it is desired that add-on program 114 detect the launch 504 of application process 502. However, in other embodiments, add-on process 500 could be launched after process 502.

As part of the approach involving CBT hook functions discussed above, one or more files from add-on program 114 are dynamically linked to process 502 at launch 504. As mentioned above, one of these files contains the detection logic used to detect an event associated with application program 112 and other files may define the add-on windows to be displayed. Once a portion of add-on program 114 has been linked with application program 112, several actions can be started or initiated by the user from add-on window 202 (see FIG. 2). These actions are executed as part of or within application process 502. For example, the user may initiate a function 510 that is executed within application program 112.

In another action the user may start a new process 512 in addition to processes 500 and 502. This new process may provide information or functionality that interacts with that provided by add-on program 114, or the new process may be the launch of a different application, for example, a steaming multimedia player. For example, a second application that is launched can display a second application window (not shown). This second application window may be a child window embedded in the parent window of the first application program, or it may be a new parent window. The second application window may display product and/or service information that is commercially competitive to information displayed in a window defined by application program 112. This information may be received and updated periodically from a remote server.

In many cases the legal entity (for example, a person, corporation, or limited liability company) that has developed, owns, and/or distributes application program 112 will be different from and not under common business control with the legal entity that has developed, owns, and/or distributes add-on program 114. Add-on window 202 and one or more of application windows 206 displayed during the operation of application program 112 may each contain advertisements that sponsor or promote competitive products and/or services.

Another example of a user action is customization 514 of the user interface for application program 112 using add-on program 114. An example of such customization is the change of the skin or colors, shapes, and designs associated with the application program user interface. One way that add-on program 114 may perform such skin customization is by sending information and instructions to the operating system to override the painting function of the operating system as previously defined by the application program. This overriding will direct the operating system painting function to new graphics files associated with the new skin. The customization of skins is provided in several currently-available software products, including, for example, the Internet browser software distributed by NeoPlanet, Inc., of Tempe, Ariz.

In another approach to the present invention, as additional application programs are launched by the user, whether from add-on program 114 or otherwise, additional add-on windows (not shown) may be displayed by add-on program 114. These additional windows may use at least in part some of the content displayed in the one or more add-on windows opened prior to the additional application programs. By this approach, a user will perceive that certain content of interest is following the user from one application to another without the need for the user to request the start of a second add-on program or other process.

Figure 6:
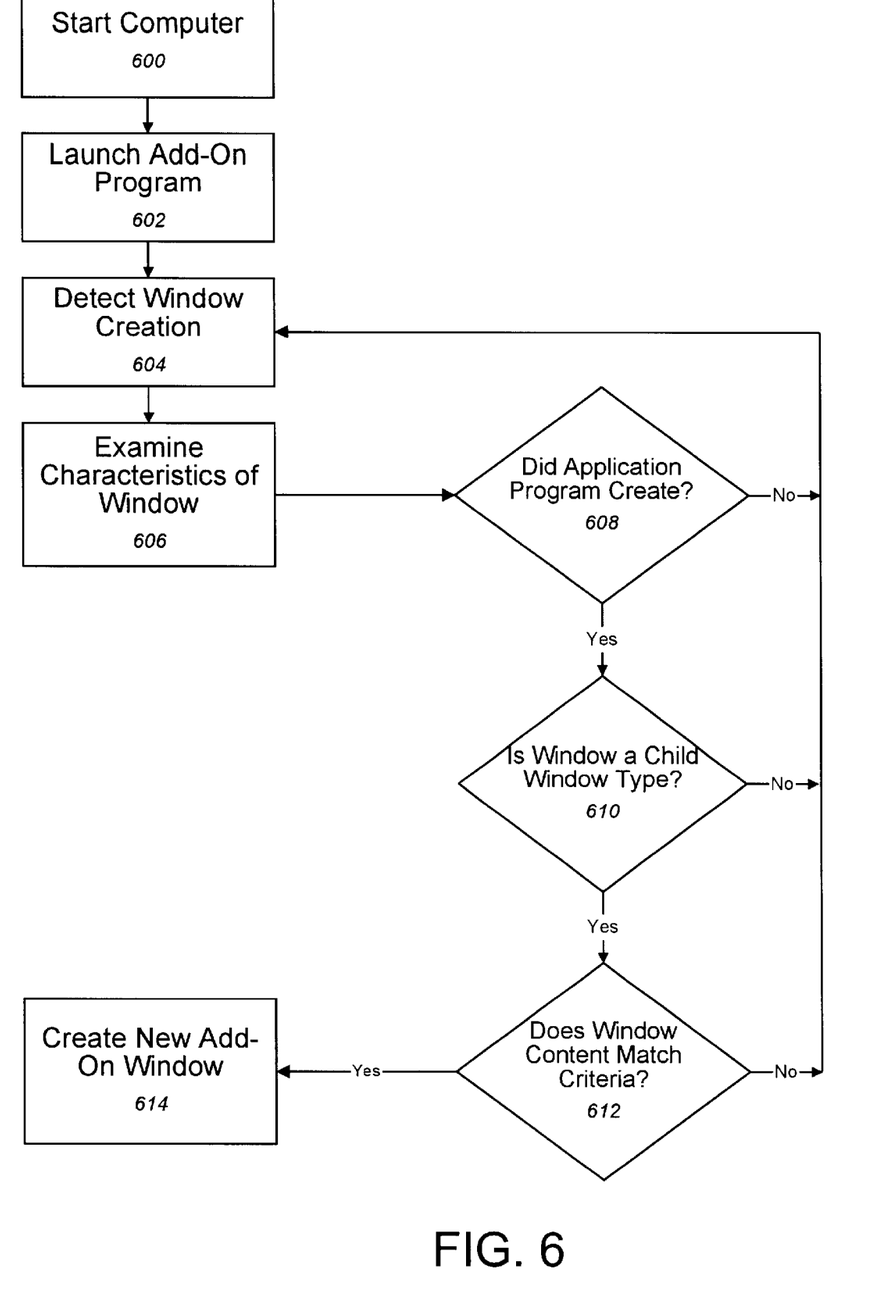
FIGS. 6 and 7 are flow diagrams illustrating a method for the display of a window according to the present invention.

FIG. 6 is a process flow diagram illustrating a method for displaying an add-on window according to the present invention. This process flow is executed by add-on program 114 and is repeatedly executed as windows are created by the operating system. Computer system 100 is started in step 600, and add-on program process 500 is launched in step 602. In step 604, add-on program 114 detects the creation of a window using a CBT hook function embedded in add-on program 114 as discussed above. This function passes information from a set of events defined by operating system 110 for computer based training applications. One of these events is the creation of a window, such as application window 204 (see FIG. 2).

In step 606, an operating system function within add-on program 114 makes an operating system call to obtain characteristics about the window just detected. In steps 608–612, several tests are made on the characteristics provided back to the add-on program to determine if the newly-detected window is the window that is desired to be detected, such as an introduction or welcome window that is displayed at start-up of application program 112.

Step 608 tests whether application program 112 created the window. If yes, step 610 tests whether the window is of the child window type. This test is illustrated herein as applied to, for example, an application program that displays child windows within a parent window, but the method is generally applicable to other application programs that do not display child windows or that do not use a multiple document interface. If yes, step 612 tests whether the window contains certain content. For example, the test determines whether the window contains the phrase "Hello". If any test fails, the process is repeated to detect subsequent windows. If all tests are satisfied, in step 614 add-on program 114 creates and displays add-on window 202 (see FIG. 2).

Figure 7:
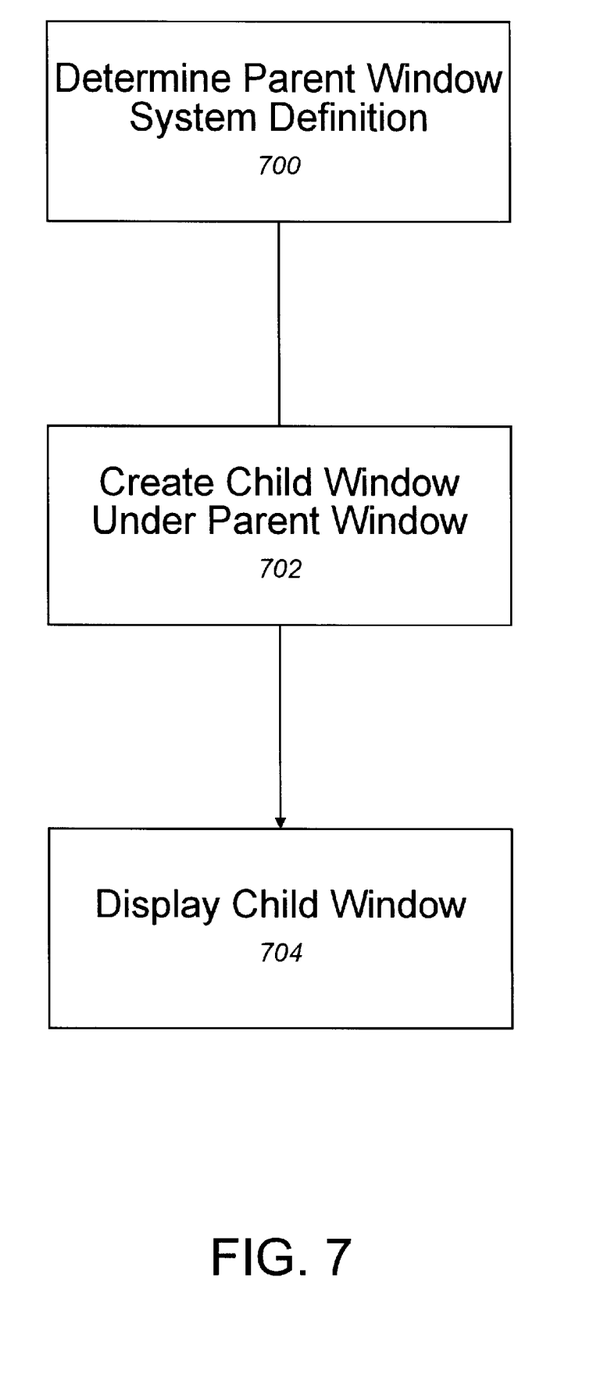

FIG. 7 is a process flow diagram illustrating the creation of add-on window 202 and corresponding to step 614 of FIG. 6. In step 700, add-on program 114 obtains an operating system window handle for the newly-created parent window just detected. This window handle may be one of the window characteristics obtained above in step 606. In step 702, add-on window 202 is created as a child window embedded in this parent window. As part of step 702, as mentioned above, an additional dll file may be dynamically linked with application program process 502 to define the child window. In step 704, this child window is displayed.

Figure 8:
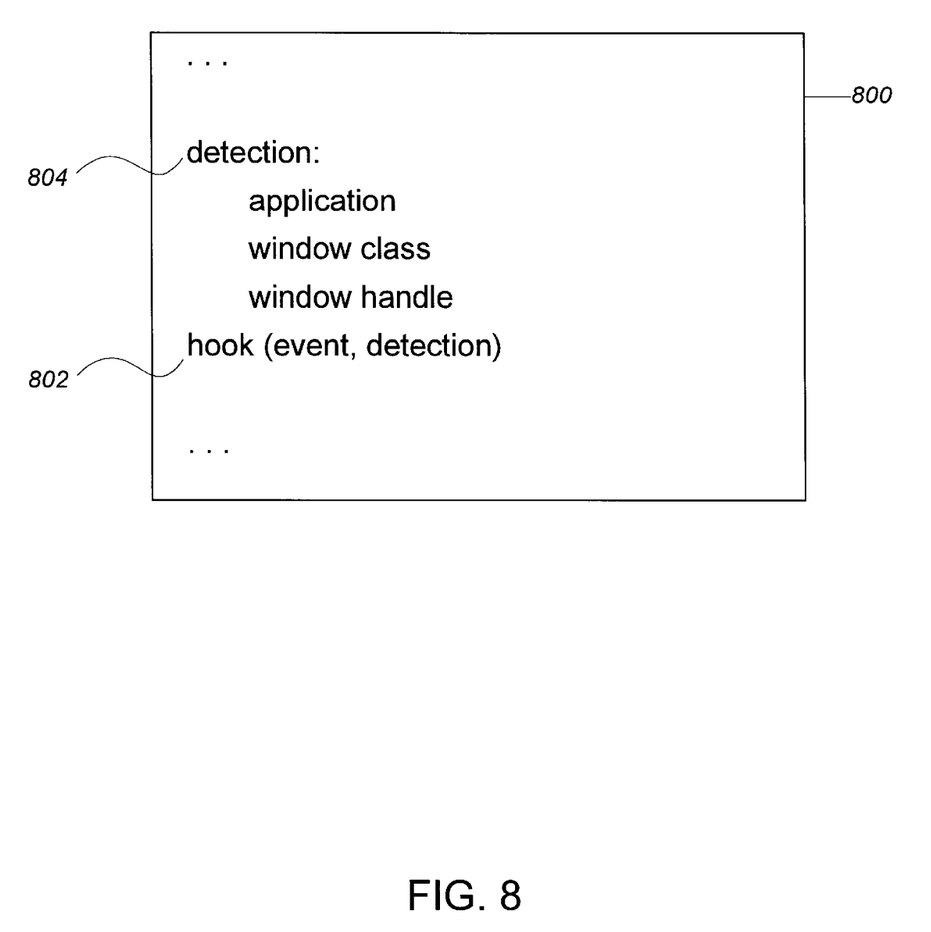
FIG. 8 illustrates a portion of the source code for the add-on program.

FIG. 8 illustrates a portion of the source code 800 (represented in psuedo-code format) for add-on program 114. Hook function 802 is an embedded operating system function 402 as discussed above at FIG. 4. Hook function 802 is used by the operating system to pass CBT hook event information to add-on program process 500 (see FIG. 5). This information includes certain system events such as window creation.

Detection function 804 is a local function within program code 800 called by hook function 802 when an event type associated with window creation is passed to hook function 802 by operating system 110. Detection function 804 corresponds to the window characteristics obtained from operating system 110 in the process flow of FIG. 6 above.

Figure 9:
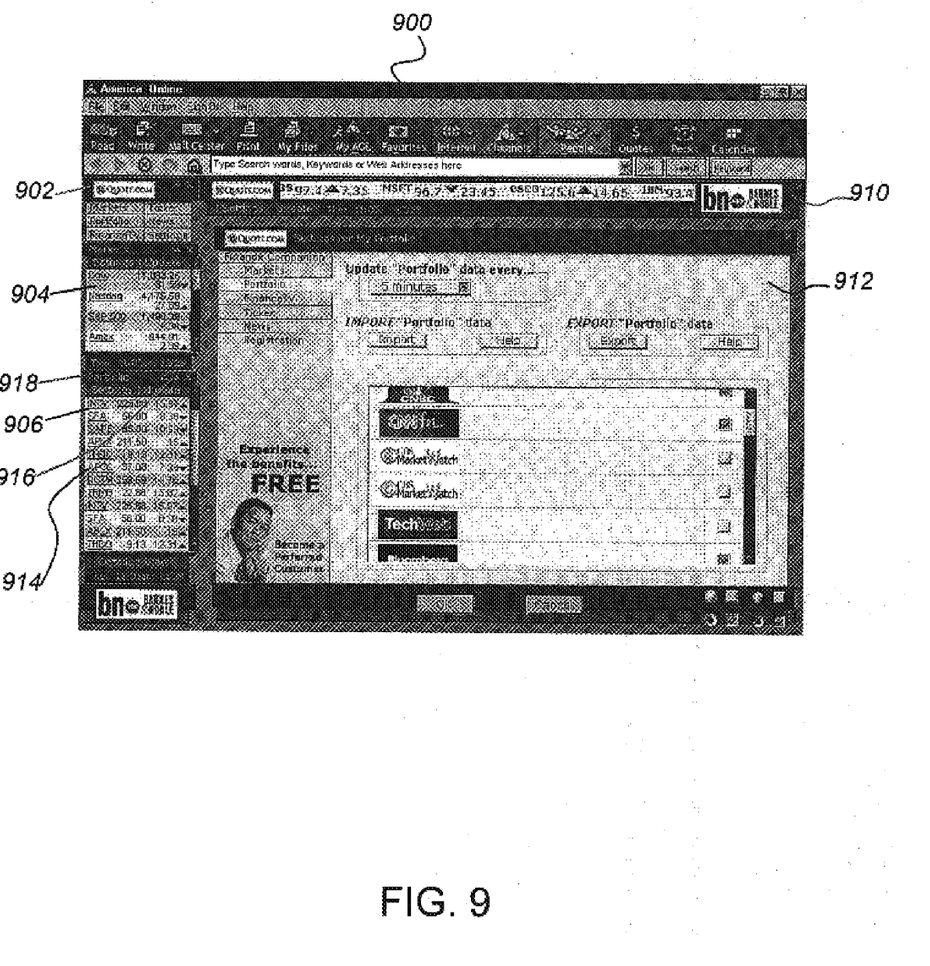
FIG. 9 illustrates an example of a parent window with an embedded child window according to the present invention.

FIG. 9 illustrates an example in a specific embodiment of a parent window with embedded child windows according to the present invention. Specifically, parent window 900 is generated by an application program. Add-on windows 902, 904, and 906 are initially displayed in a docked configuration as shown and are generated by an add-on program as generally described above, for example as child windows embedded in parent window 900. Window 910 is an additional child window generated by the add-on program, which may be opened at the same time as windows 902, 904, and 906. Window 912 is an application window that is generated by the application program. Bottom portion 914 of each add-on window 902, 904, and 906 rolls up like a rolling window shade (this is activated when a user, for example, clicks on arrow icon 916 using a mouse) into header bar 918 for each window so that only header bar 918 appears in parent window 900 when in such a rolled-up state.

Timer Counter Approach

According to another approach for the present invention, the method used to detect and initiate the display of an add-on window may be varied from the foregoing. Specifically, add-on program 114 may detect the opening or presence of application window 204 by making an operating system call from add-on program 114 to request windows data 404 for all windows currently open in computer system 100. This system call is made periodically, for example every 0.1–2.0 seconds, and is controlled by a countdown timer implemented in add-on program 114.

More specifically, in this timer approach, add-on program 114 comprises a main executable file that is loaded prior to application program 112, such as at the start-up of computer system 100. The main executable file uses a software counter to periodically query operating system 110 for information about all windows being displayed at the time of the query. For each window, the main executable program determines whether the window is associated with application program 112 by determining the caption name and class type assigned to the window by the operating system. The class type and caption name are determined by the developer of application program 112 and passed to the operating system when defining the window. For example, the caption name may be the name of the company that has developed application program 112.

In one approach for periodically obtaining window information, add-on program 114 determines if the operating system has opened a parent window of a certain class type and having a certain caption name. An example of such a class type is a type that is defined by the application program, in which case the class type is given an identifying name by the application program. The caption name may be, for example, a company name or any other text string. If add-on program 114 determines that the class type and caption name for the parent window match the values associated with a process in which is running application program 112, then add-on program 114 next tests to see if there is a child window embedded in the parent window. For example, this child window may be of the type MDI Client as defined in the Windows Operating System, and add-on program 114 will test for this specific type of window. However, other types of child windows are also possible that may be tested for by add-on program 114. In this specific approach, the caption name of the child window is not tested, but it could be tested in other approaches if this would aid in the identification of application program 112.

One way in which the window caption name and class types that are associated with application program 112 can be determined is by using a development utility program, such as Spy++ available from Microsoft Corporation, to determine the caption name and class types corresponding to windows that have been opened by application program 112 at the point in its execution for which it is desired to display an add-on window.

The periodic query of windows data 404 described above is done each time the countdown timer reaches zero until detection of application window 204 is confirmed by the logic in the main executable file. The foregoing system call and window information obtained generally correspond to function call 426 and message interception 424 as illustrated above for FIG. 4.

If add-on program 114 detects that application window 204 is being displayed, then a hooking file, such as a dll file, is then dynamically linked with the process that is then running application program 112. The hooking file is another file forming part of add-on program 114, and, when application program 112 has been detected according to the tests described above, the main executable file of add-on program 114 loads the hooking file and then uses an operating system hook embedded in the hooking file to add the hooking file to the same process as application program 112. This process is sometimes referred to in the art of software development as "dll injection".

According to a specific approach, the hooking file is linked with application program process 502 by using the CBT hook feature of the Windows Operating System, which was previously described above. In this approach, a CBT hook is embedded in the hooking file. The process in which application program 112 is running is the specific process to be hooked, and the Windows Operating System permits specific identification of a process thread to be hooked with the CBT hook. The CBT hook causes the operating system to link the hooking file with the application program process. Then, the hooking file calls other dll files to link with the application program process. These other files define and display, for example, add-on window 202.

There are other types of hook functions that may be used instead of CBT hooks for linking an add-on program with other types of application programs according to the present invention. Examples of these hooks in the Windows Operating System include WH_SHELL, WH_CALLWNDPROC, WH_GETMESSAGE, and WH_MSGFILTER.

An advantage of the present invention achieved by the foregoing approach is that one or more add-on program files may be linked to the same process as the application program. In particular, this can be accomplished as described above without requiring that the hooking file be linked with every process started in the computer system. This is in contrast to the approach in which CBT hooks are linked with every process started in the computer system. A limitation associated with linking the hooking file with every process is an increased processing load on the computer system and greater system instability, which can lead to a system crash. In contrast, the above approach permits linking of the hooking file with only a specifically identified process that has been located through the searching algorithm described above.

Closing

By the foregoing description, a novel and unobvious method, system, and computer product for displaying a window has been disclosed. The present invention has the advantages of providing an improved way to add functionality to Internet and other software programs not having published APIs. Another advantage is that business competitors or others desiring to present competitive or other types of product and/or service information to users of a software program now have a method for displaying windows to a user of a computer system running the software program where such display is initiated based on actions taken by users of, or events associated with, the software program. Other advantages of the present invention include the ability to manipulate an application program using an add-on program without the need for detailed information from the source code of the application program and without the need to do reverse engineering of the application program. Further, the present invention provides a way for an add-on program to use an operating system function to link one or more add-on program files to an application program even though the application program was not originally designed or intended to link with these additional files.

Although specific embodiments have been described above, numerous modifications and substitutions may be made thereto without departing from the spirit of the invention. For example, while the description of preferred embodiments above is discussed specifically in the context of an application program running on a computer system with a local storage unit, other types of computer systems may be used such as personal digital assistants (PDAs), network appliances, dumb terminals, or other types of systems having only a subset of the hardware components of computer system 100. Accordingly, the invention has been described by way of illustration rather than limitation.

What is claimed is:

1. A method in a computer system for embedding a child window in a parent window wherein the parent window is defined by a first application program running in the computer system and the child window is defined by an add-on program, the method comprising:

detecting, using the add-on program, an event executed by the first application program;

in response to the detecting of the event, embedding the child window in the parent window, wherein the add-on program comprises a first portion that defines the child window and a second portion that detects the event, wherein the first portion of the add-on program is associated with the first application program at the initiation in the computer system of the first application program, and wherein the second portion of the add-on program is initiated prior to the initiation of the first application program.

2. The method of claim 1 wherein the first portion of the add-on program comprises a dynamically linked file linked to the first application program.

3. The method of claim 1 wherein the first application program comprises a user interface and the add-on program enables the user to modify the user interface of the first application program.

4. The method of claim 1 wherein the first application program accesses content from a remote server for display in the child window.

5. The method of claim 1 wherein the child window permits a user of the computer system to initiate a second application program.

6. The method of claim 1 wherein the child window comprises a plurality of detachable windows.

7. The method of claim 1 wherein the functionality of the add-on program is updated by a tracking server.

8. The method of claim 1 wherein the usage of the add-on program by a user of the computer system is monitored by a tracking server.

9. The method of claim 1 wherein the event comprises displaying to a user of the computer system an application child window embedded in the parent window, wherein the application child window is defined by the first application program.

10. The method of claim 9 wherein the detecting of the event comprises determining if the application child window contains content matching a requirement defined by the add-on program.

11. The method of claim 1 wherein the event is the initiation of an the application program in the computer system.

12. The method of claim 1 wherein the event is the display of an introduction or welcome window.

13. A method in a computer system for displaying to a user an add-on window created by an add-on program, the method comprising:

detecting, using the add-on program, the display to the user of a first application window created by a first application program running in the computer system;

in response to the detecting of the display of the first application window, displaying the add-on window to enable the user to initiate a function in the computer system; and displaying to the user a second application window created by the second application program, wherein the function comprises initiating a second application program in the computer system, and wherein the second application window displays product or service information that is commercially competitive to information displayed in the first application window.

14. The method of claim 13 wherein the function comprises modifying the user interface of the first application program.

15. The method of claim 13 wherein the second application window displays content received from a remote server.

16. The method of claim 13 wherein the add-on window is a child window embedded in the first application window.

17. The method of claim 16 wherein the function comprises displaying an additional window wherein the additional window is a child window embedded in the first application window.

18. A method in a computer system for displaying to a user an add-on window created by an add-on program, the method comprising:

detecting, using the add-on program, the display to the user of an application window created by an application program;

in response to the detecting of the display of the application window, displaying the add-on window to the user;

displaying in the application window a first set of content corresponding to a first product of service; and displaying in the add-on window a second set of content corresponding to a second product or service in commercial competition with the first product or service.

19. The method of claim 18 wherein the application program displays content received from a first remote server in the add-on window.

20. The method of claim 19 wherein the add-on window allows the user to initiate the transmission of information to the computer system from a second remote server.

21. The method of claim 20 further comprising executing a business transaction with the user using the second remote server.

22. The method of claim 18 further comprising displaying dynamic content in the add-on window.

23. The method of claim 22 wherein the add-on window is a child window embedded in the application window.

24. The method of claim 23 wherein a portion of the add-on program corresponding to the add-on window is initiated in the same process in the computer system as the application program.

25. The method of claim 18 wherein:

the add-on window comprises a first advertisement;

the application window comprises a second advertisement;

the add-on program is controlled by a first legal entity;

the application program is controlled by a second legal entity; and the first legal entity and the second legal entity are not under common business control.

26. The method of claim 18 further comprising:

initiating a plurality of additional application programs in the computer system; and in response to the initiating of each of the plurality of additional application programs, displaying an additional add-on window to the user wherein the additional add-on window comprises information at least in part corresponding to the add-on window.

27. The method of claim 18 further comprising transmitting information to a tracking server regarding at least one characteristic of the application program.

28. A method in a computer system for embedding a child window in a parent window wherein the parent window is defined by a first application program running in the computer system and the child window is defined by an add-on program, the method comprising:

detecting, using the add-on program, an event executed by the first application program;

in response to the detecting of the event, embedding the child window in the parent window, wherein the event comprises displaying to a user of the computer system an application child window embedded in the parent window, wherein the application child window is defined by the first application program; and wherein the detecting of the event comprises determining if the application child window contains content matching a requirement defined by the add-on program.

29. A method in a computer system for displaying to a user an add-on window created by an add-on program, the method comprising:

detecting, using the add-on program, the display to the user of an application window created by an application program;

in response to the detecting of the display of the application window, displaying the add-on window to the user; and wherein the add-on window comprises a first advertisement, the application window comprises a second advertisement, the add-on program is controlled by a first legal entity, the application program is controlled by a second legal entity, and the first legal entity and the second legal entity are not under common business control.

* * * * *